(12) United States Patent
Hoeflaak et al.

(10) Patent No.: US 11,904,556 B2
(45) Date of Patent: Feb. 20, 2024

(54) BOND TESTER APPARATUS FOR DETERMINING A STRENGTH OF A BOND AND/OR A MATERIAL PRESENT ON A BASE, AND METHOD

(71) Applicant: XYZTEC B.V., Panningen (NL)

(72) Inventors: Arjen Hoeflaak, Panningen (NL); Cornelis Bartholomeus Maria Van Mil, Panningen (NL); Robert John Sykes, Panningen (NL)

(73) Assignee: XYZTEC B.V., Panningen (NL)

( * ) Notice: Subject to any disclaimer, the term of this patent is extended or adjusted under 35 U.S.C. 154(b) by 484 days.

(21) Appl. No.: 16/972,126

(22) PCT Filed: Jun. 4, 2019

(86) PCT No.: PCT/NL2019/050334
§ 371 (c)(1),
(2) Date: Dec. 4, 2020

(87) PCT Pub. No.: WO2019/235924
PCT Pub. Date: Dec. 12, 2019

(65) Prior Publication Data
US 2021/0229371 A1    Jul. 29, 2021

(30) Foreign Application Priority Data

Jun. 4, 2018    (NL) ...................... 2021048

(51) Int. Cl.
| | |
|---|---|
| *G01N 3/04* | (2006.01) |
| *G01N 3/24* | (2006.01) |
| *G01N 9/04* | (2006.01) |
| *B29C 65/82* | (2006.01) |
| *G01N 19/04* | (2006.01) |

(52) U.S. Cl.
CPC ........... *B29C 65/8207* (2013.01); *G01N 3/04* (2013.01); *G01N 3/24* (2013.01); *G01N 19/04* (2013.01)

(58) Field of Classification Search
CPC ...... B29C 65/8207; B29C 65/82; G01N 3/24; G01N 19/04; G01N 3/00; G01N 3/08; G01N 3/10; G01N 3/04; G01N 3/42; G01N 3/30; G01R 31/2868
See application file for complete search history.

(56) References Cited

U.S. PATENT DOCUMENTS 8,424,390 B2 *   4/2013   Lilley ...................... G01N 3/24
                                                    73/842
2008/0190212 A1   8/2008   Sykes

FOREIGN PATENT DOCUMENTS

| EP | 2363701 A1 | 9/2011 |
| EP | 2363702 A1 | 9/2011 |
| WO | WO-2022164311 A1 * | 8/2022 |

OTHER PUBLICATIONS

International Search Report dated Sep. 23, 2019 for PCT/NL2019/050334.

* cited by examiner

*Primary Examiner* — Brandi N Hopkins
(74) *Attorney, Agent, or Firm* — Suiter Swantz pc llo

(57) ABSTRACT

A bond tester apparatus arranged for determining a strength of a bond and/or a material present on a base, said bond tester apparatus comprising a force measurement module for applying a shear force to said bond and/or said material, and a displacement module and a controller arranged for controlling the distance between the force measurement module and the displacement module such that the shear height of a shear tool can be set.

8 Claims, 2 Drawing Sheets

BOND TESTER APPARATUS FOR DETERMINING A STRENGTH OF A BOND AND/OR A MATERIAL PRESENT ON A BASE, AND METHOD

BACKGROUND

Electrical connections in semiconductor and electronic assemblies often include bonds and it is known that these can be mechanically tested as a means of measuring their quality. One such test is done on a system known as a Bond Tester and is known as a shear test where a part of the bond tester known as a shear tool loads the bond to either a specific load or until a failure of some type occurs. The positional alignment accuracy of the tool to the bond is known to be of great importance and a number of designs exist to obtain the best accuracy possible. In line with the three dimensions of space there are three alignments of the tool. This invention pertains to one of these known as the "shear height" or associated "step back height". The accuracy of this alignment is the most important and often limited to that possible from the known technology, it is then advantageous to make improvements to it. This invention is a new design that improves the accuracy of the step back and the height of the tool when it performs the test which is known as the shear height.

SUMMARY

It is an object of the present disclosure to provide for a bond tester apparatus, as well as a corresponding method, which is able to accurately set the shear height of a shear tool.

In a first aspect of the present disclosure, there is provided a bond tester apparatus arranged for determining a strength of a bond and/or a material present on a base, said bond tester apparatus comprising:
1) a force measurement module, comprising:
   a shear tool arranged for applying a shear force to said bond and/or said material;
2) a displacement module, comprising:
   a movable rigid body, preferably, in use, in a substantial vertical direction;
   a movable member arranged for movably connecting said force measurement module to said displacement module thereby providing a displacement distance between said rigid body and said force measurement module;
   a displacement sensor arranged for measuring said displacement distance;
3) a controller arranged for:
   monitoring said measured displacement distance;
   moving said rigid body, and thereby also said force measurement module, towards said base until said shear tool comes in contact with said base thereby obtaining a contact displacement distance;
   controlling said displacement member to clamp said force measurement module to said displacement module such that a distance between said base and said shear tool is said contact displacement distance;
   moving said rigid body, and thereby also said force measurement module, preferably vertically to set a shear height of said shear tool, based on said contact displacement distance.

Preferably, said force measurement module comprises a shear sensor, connected to said shear tool, and arranged for measuring said applied shear force.

In the context of the present disclosure, the displacement member may be formed in such a way that it acts as some sort of shock absorber. This entails that the displacement member is arranged to connect the displacement module to the force measurement module in such a way that the distance between these modules is kept constant. The displacement member is then arranged to absorb a shock, i.e. the shear tool comes in contact with the base. The result hereof is that the displacement distance between the force measurement module and the displacement module becomes smaller.

The displacement member is further formed in such a way that it can be controlled in such a way that the distance between the displacement module and the force measurement module can be controlled. It may thus operate as an active element by using a hydraulic or pneumatic principle, or anything alike.

The displacement member, for example, comprises:
  a piston connected, at one end, to said force measurement module;
  an, in use, vertically expandable chamber, wherein said piston is connected, at another end, to an expandable part of said chamber;
  an inlet/outlet port for introducing, and removing, a fluid in, from, said expandable chamber for expanding, and shrink, said expandable chamber, thereby controlling said displacement distance between said displacement module and said force measurement module.

BRIEF DESCRIPTION OF THE DRAWINGS

Features of the invention will be apparent from the following description with reference to the accompanying drawings in which:

FIG. 2 shows a schematic representation of the invention and the components it is comprised of.

DETAILED DESCRIPTION

Figure 1:
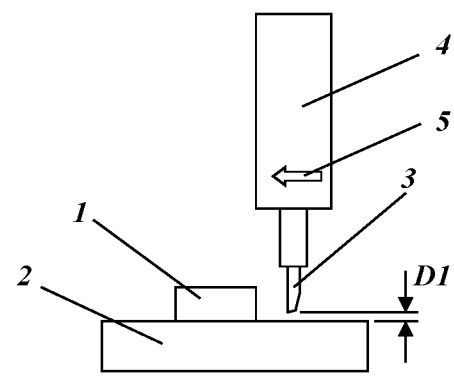
FIG. 1 shows a schematic representation of a bond and a shear tool in the alignment position prior to testing the bond.

In the schematic representation FIG. 1 electrical (or semiconductor) part 1 is bonded to a base or substrate 2, this being the bond to be tested. There are many different type of "electrical part" including but not limited to electrical packages, silicon chips, copper conductors and solder balls. There are also many different types of base including but not limited to FR4 or ceramic circuit boards and silicon chips. Shear tool 3 is mounted to body 4 which in most cases is a force measurement system. Shear tool 3 is aligned at step back distance D1 from base 2. Maintaining distance D1, the component and shear tool are then brought into contact in the direction of arrow 5 by a bond tester. The bond is tested when the tool collides with the electrical part 1, typically the force from the sensor is recorded together with the amount of movement in the direction of arrow 5 and the time taken. The quality of the bond is characterised by the force measurement and type of failure with in the bond, known as "Failure Mode". Within the known art the alignment accuracy of step back distance D1 is typically ±1 µm. The invention can achieve this and substantially less.

Figure 2:
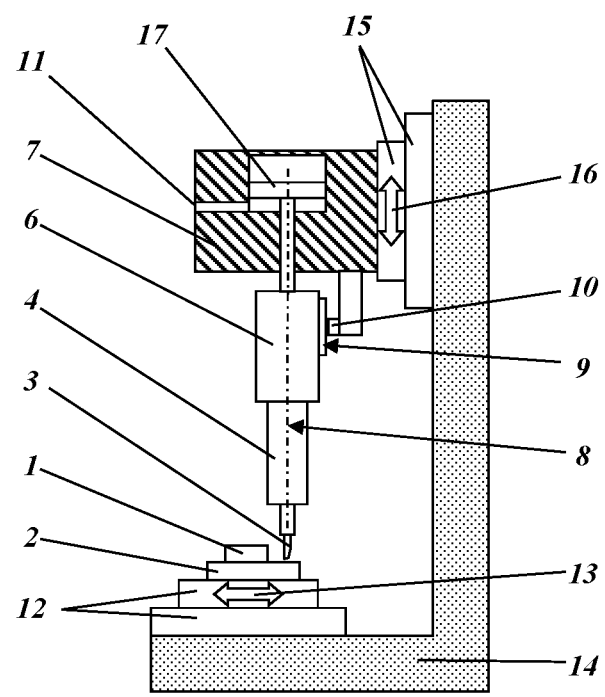

FIG. 2 shows a schematic representation of the invention and the components it is comprised of. Shear tool 3 and body/sensor 4 are rigidly mounted on to component 6 which is in turn rigidly mounted to component 7 but such that it is free to move within limits along line 8 relative to it. Line 8 being substantially normal to the plane of the top of base 2. The relative position of component 6 to component 7 is measured by a displacement sensor shown as components 9 and 10. The accuracy of the measurement of the relative distance between components 6 and 7 along line 8 using sensor 9, 10 should be in the order of 0.1 to 0.01 μm. In a preferred embodiment of the invention, but not limited to it, this displacement sensor is a linear encoder with grating 9 and reading head 10. Component 6 can be securely clamped to component 7 by some means with it still moving along line 8, with submicron repeatability in the order of at least 0.1 μm along line 8 between successive clamps. A means of achieving this would be known to one skilled in such arts. In a preferred embodiment the clamping would be by supplying compressed air to piston 17 via port 11, pulling and then clamping component 6 to component 7.

Electrical part 1 and its base 2, when combined known as the "sample", are mounted on a movable "stage" 12 such that they can be moved relative to tool 3 along axis 13. A stage is known by one skilled in art as a component that produces precise linear movement along an axis, in this case axis 13. There may also be another axis perpendicular to the plane of FIG. 2 so the electrical part and others like it can be moved to the test position of tool 3. Stage 12 is fixed to a main frame 14. Similarly Stage 15, also fixed to frame 14, can move component 7 along axis 16. These stages combined can align/position tool 3 at many different positions relative to the sample. For the purpose of this invention stage 15 will have an accuracy along axis 16 of at least 0.1 μm. For the purposes of this invention it is advantageous that tool 3 can be aligned to step back distance D1 and moved to the sample along axis 13. FIG. 2 is a preferred embodiment but the invention includes alternatives that achieve the same with a different configuration, for example but not limited to, fixing the sample to frame 14 and providing movement of the tool along axis 13 by fixing stage 12 to stage 15.

FIGS. 3a to 3d show a schematic representation of the inventions sequence of operation in achieving the precise step back. The sequence of operation is FIG. 3a then FIG. 3b then FIG. 3c and lastly FIG. 3d where the tool is then at the required step back distance.

Figure 3A:
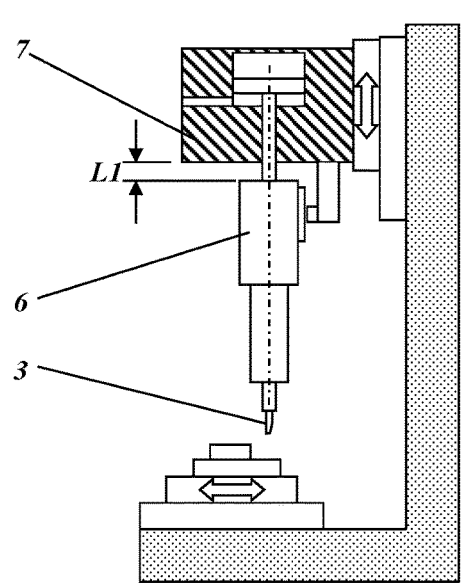
FIGS. 3a to 3d show a schematic representation of the inventions sequence of operation in achieving the precise step back.

In FIG. 3a tool 3 is not at the required step back height D1, it is at rest together with all other components related to the invention. It can be seen that there is clearance L1 between component 6 and component 7.

Figure 3B:
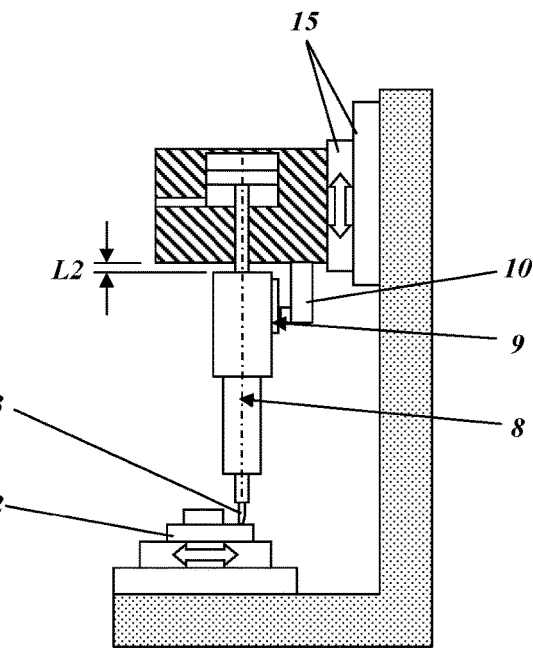

In FIG. 3b stage 15 has driven tool 3 and the components that connect it to the stage along the axis of line 8 such that tool 3 collides with base 2. The contact between the tool 3 and base 1 causing distance L1 to be reduced to L2. The resulting movement between components 6 and 7 is detected by sensor 9, 10. The contact between tool 3 and base 2 can be detected by any means but in a preferred embodiment it is detected by sensor 9, 10. On detecting contact between the tool 3 and base 2 sensor 9, 10 records its measured position, stage 15 can also be instructed to stop. It is preferable that the means of detecting contact between the tool and base together with the mass and speed of moving components is designed so that no damage is done to the tool or base.

Figure 3C:
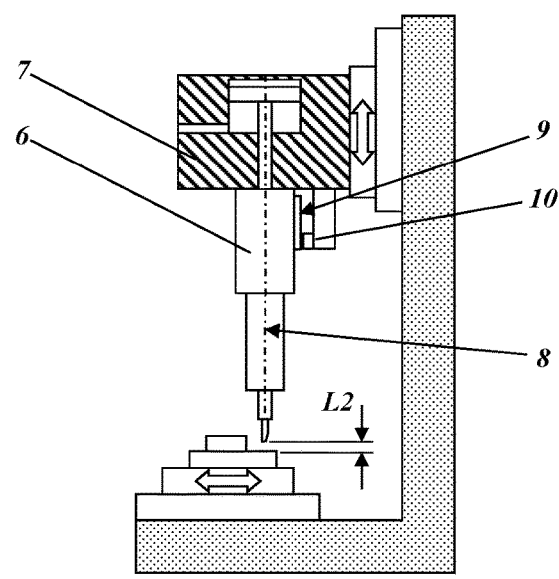

In FIG. 3c component 6 is clamped to component 7 by moving along the axis of line 8 until the previously shown L2 is reduce to zero. As in the preferred embodiment previously mentioned this would be achieved by supplying compressed air to port 11 such that piston 17 provides the clamping movement and a clamping force. The movement of component 6 relative to component 7 is detected and recorded by sensor 9, 10. The difference in the positions of sensor 9, 10 in the steps shown in FIG. 3b and FIG. 3c will be the distance parallel to the axis of line 8 now separating tool 3 and base 2.

Figure 3D:
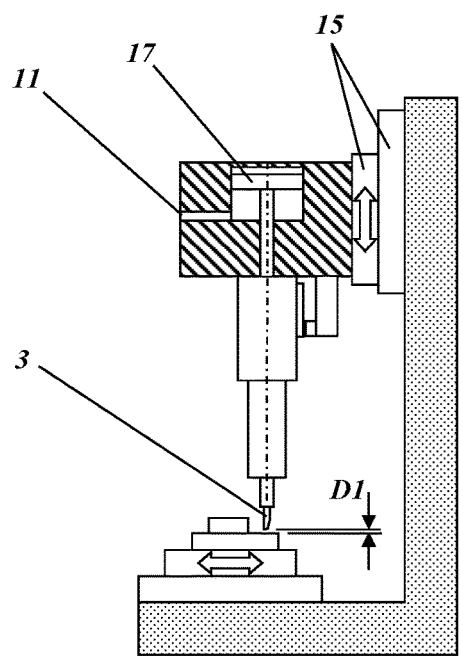

In FIG. 3d tool 3 is driven by stage 15 to the required step back distance, the distance stage 15 moves being L2 less D1. In these illustrations D1 is less than L2 so the tool has moved closer to the base. If the required D1 is larger than L2 within the convention of these illustrations the move distance would be negative such that the tool would move away from the base.

The invention claimed is:

1. A bond tester apparatus configured for determining a strength of a bond and/or a material present on a base, the bond tester apparatus comprising:
    a force measurement module comprising a shear tool configured to apply a shear force to the bond and/or the material;
    a displacement module, comprising:
        a movable rigid body;
        a movable member configured to movably connect the force measurement module to the displacement module thereby providing a displacement distance between the rigid body and the force measurement module; and
        a displacement sensor configured to measure the displacement distance; and
    a controller configured to:
        monitor the measured displacement distance;
        move the rigid body, and thereby also the force measurement module, towards the base until the shear tool comes in contact with the base to obtain a contact displacement distance;
        control the displacement module to clamp the force measurement module to the displacement module such that a distance between the base and the shear tool is the contact displacement distance; and
        move the rigid body, and thereby also the force measurement module, to set a shear height of the shear tool, based on the contact displacement distance.

2. The bond tester apparatus according to claim 1, wherein the force measurement module further comprises a shear sensor, connected to the shear tool, and configured to measure the applied shear force.

3. The bond tester apparatus according to claim 1, wherein the displacement sensor comprises a linear encoder with a grating and reading head.

4. The bond tester apparatus according to claim 1, wherein the displacement module further comprises:
    a piston connected, at one end, to the force measurement module;
    an, in use, vertically expandable chamber, wherein the piston is connected, at another end, to an expandable part of the vertically expandable chamber; and
    an inlet/outlet port for introducing, and removing, a fluid in, from, the vertically expandable chamber for expanding, and shrink, the vertically expandable chamber, to control the displacement distance between the displacement module and the force measurement module.

5. The bond tester apparatus according to claim 1, wherein the controller is arranged to detect that said shear tool comes in contact with said base by monitoring a reduction in said measured displacement distance.

6. A method for determining a strength of a bond and/or a material present on a base using a bond tester apparatus comprising:

a force measurement module comprising a shear tool configured to apply a shear force to the bond and/or the material;

a displacement module, comprising:
  a movable rigid body;
  a movable member configured to movably connect the force measurement module to the displacement module to provide a displacement distance between the rigid body and the force measurement module; and
  a displacement sensor configured to measure the displacement distance; and a controller configured to:
  monitor the measured displacement distance;
  move the rigid body, and thereby also the force measurement module, towards the base until the shear tool comes in contact with the base to obtain a contact displacement distance;
  control the displacement module to clamp the force measurement module to the displacement module such that a distance between the base and the shear tool is the contact displacement distance; and
  move the rigid body, and thereby also the force measurement module, to set a shear height of the shear tool, based on the contact displacement distance;

wherein the method comprises the steps of:
  monitoring, by the controller, the measured displacement distance;
  moving, by the controller, the rigid body, and thereby also the force measurement module, downwards until the shear tool comes in contact with the base thereby obtaining a contact displacement distance;
  controlling, by the controller, the displacement member to clamp the force measurement module to the displacement module such that a distance between the base and the shear tool is the contact displacement distance; and
  moving, by the controller, the rigid body, and thereby also the force measurement module, to set a shear height of the shear tool, based on the contact displacement distance.

7. The method according to claim 6, wherein the bond tester apparatus further comprises:
  a piston connected, at one end, to the force measurement module;
  an, in use, vertically expandable chamber, wherein the piston is connected, at another end, to an expandable part of the vertically expandable chamber; and
  an inlet/outlet port for introducing, and removing, a fluid in, from, the vertically expandable chamber for expanding, and shrink, the vertically expandable chamber, to control the displacement distance between the displacement module and the force measurement module;
  and wherein the step of controlling further comprises:
  introducing, or removing, the fluid in, or from, the vertically expandable chamber.

8. The method according to claim 6, wherein the step of moving the rigid body downward comprises:
  detecting that the shear tool comes in contact with the base by monitoring a reduction in the measured displacement distance.

\* \* \* \* \*